United States Patent [19]

Yen

[11] Patent Number: 5,135,397

[45] Date of Patent: Aug. 4, 1992

[54] 3-D WEATHER FOR DIGITAL RADAR LANDMASS SIMULATION

[75] Inventor: Craig S. Yen, Reston, Va.

[73] Assignee: Hughes Aircraft Company, Los Angeles, Calif.

[21] Appl. No.: 545,213

[22] Filed: Jun. 28, 1990

[51] Int. Cl.[5] .......................... G09B 9/40; G01S 13/95
[52] U.S. Cl. ......................................... 434/2; 342/26; 364/578
[58] Field of Search ............... 434/2; 342/26; 364/578

[56] References Cited

U.S. PATENT DOCUMENTS

| | | | |
|---|---|---|---|
| 3,894,347 | 7/1975 | Sleven et al. | 434/5 |
| 4,085,524 | 4/1978 | Meyer | 434/2 |
| 4,493,647 | 1/1985 | Cowdrey | 434/2 |
| 4,667,199 | 5/1987 | Roberts | 342/169 X |
| 4,780,084 | 10/1988 | Donovan | 434/2 |
| 4,890,249 | 12/1989 | Yen | 364/578 |

OTHER PUBLICATIONS

Mattera et al., "Digital Radar Land Mass Simulator", Electrical Communication vol. 50, No. 4 pp. 313–316, 1975.
Hammond et al., "Radar Navigation Trainer, Device 15F12" Journal of the Inst. of Navigation, vol. 24, No. 3, 1977, pp. 229–236.
Faintich M., "Digital Sensor Simulation at the Defense Mapping Agency Aerospace Center" Conf.: Proceedings IEEE 1979 Nat. Aero. and Elec. Cont. Dayton Ohio.

*Primary Examiner*—Gilberto Barron, Jr.
*Attorney, Agent, or Firm*—Michael W. Sales; Wanda K. Denson-Low

[57] ABSTRACT

Weather simulation is a modular addition to a digital radar landmass simulator (DRLMS). The DRLMS is a four channel system, i.e., culture, elevation, aspect and weather. All four channels are integrated to provide a simulated radar landmass simulation with weather. Implementation entails the full or partial occultation of terrain and targets by weather and vice versa. Weather mass is simulated in three dimensions; that is, it has a bottom and height. The weather mass is not made of simple geometric objects. Weather maps can be loaded into the system as weather patterns, and the weather patterns can be expanded, rotated and translated. In addition, the weather channel can be used to simulate chaff and jamming patterns.

12 Claims, 6 Drawing Sheets

3-D WEATHER FOR DIGITAL RADAR LANDMASS SIMULATION

BACKGROUND OF THE INVENTION

1. Field of the Invention

The present invention generally relates to digital radar landmass simulation (DRLMS) and, more particularly, to a real time three-dimensional, high-resolution radar weather simulation with adjustable parameters, as a modular addition to a multi-channel digital landmass simulator for flight simulations. More specifically, the invention relates to certain techniques for data compression/decompression of weather patterns, for weather attenuation and backscattering and weather expansion, and for superposition on a ground map.

2. Description of the Prior Art

Computer image generation (CIG) is used in visual training simulators which present scenes to an observer or trainee to allow the observer to practice some task, such as flying an airplane. In a flight simulator, for example, a three-dimensional model of the desired "gaming area" is prepared and stored on magnetic disk or similar bulk storage media. The visual simulator combines an image generator with an electro-optical display system such as a cathode ray tube (CRT) or similar display. The image generator reads in blocks of three-dimensional data from the disk and transforms this data into two-dimensional scene descriptions. The two-dimensional data are converted to analog video that is presented to the operator or trainee via the display. The generated imagery is meant to be representative of the true scenes that the operator would see if the operator were actually performing the task being simulated. The generation of the display images is said to be in "real time" which is normally taken to mean 30 frames per second, as in the U.S. television standard. CIG systems are described in detail in the book entitled *Computer Image Generation* edited by Bruce J. Schacter and published by Wiley-Interscience (1983).

Radar simulation is an important tool for the training of pilots. There has been much progress in radar in the recent years in terms of higher resolution. Typically, the radar is used for storm avoidance, obstacle avoidance, navigation in poor weather, and target acquisition, among other things. Accordingly, a digital radar land mass simulator (DRLMS) has to be able to process the ever increasing amount of landmass data in real time. Data compression and data retrieval have become a critial area where new techniques and hardware are needed to be developed that are cost effective and support the higher throughput rate required for DRLMS.

U.S. Pat. No. 3,769,442 to Heartz discloses a digital radar landmass simulator wherein the cultural features and prominent terrain features such as ridges and valleys are described by means of a sequence of connected edges. Each edge is defined by the two end positions in x,y,z coordinates and the direction. This edge information is stored in an on-line memory. The real time hardware then interpolates between the end points of the data along the edge. This technique can generate good data compression when the edges are long. This technique is only for the encoding of prominent terrain features and does not apply to the compression of a geographical area at a resolution of 30 meters for level II and 100 meters for level I. In a later patent, U.S. Pat. No. 4,017,985, Heartz discloses a system wherein the terrain is fitted with a number of faces enclosed by edges. The terrain along a radial sweep is calculated by its intersection with the faces. For large faces, the compression ratio is high. However, for high resolution data bases, when the number of faces approaches the number of display pixel elements, the data stored for the faces may exceed the data otherwise stored for each pixel, and the advantage of this compression technique diminishes.

Others have described data compression and reconstruction techniques in digital moving map displays. The requirements for data retrieval, compression and reconstruction are similar between digital moving map displays and DRLMS. As one example, U.S. Pat. No. 4,520,506 to Chan et al. describes a modified boundary/footprint approach for the compression of culture features. The scheme is that the compression of culture including linear and area data, is based upon a line generating technique, knowing the starting and the end point data and the gradient in between. To reconstruct an area knowing the information describing the edges enclosing it, a scan line data can be filled in knowing the end point values defined by the intersections of the scan line with the left and right edges of an area. The area, line and point data are reconstructed in descending priority. Again, the compression technique is to encode the feature data in terms of the end points of an edge. Large compression can be achieved when the lines are long and the surfaces are large.

Weather simulation has two components, the simulation of the backscattering of radar return of the weather mass itself and the attenuation of terrain by the weather. A typical weather radar simulator simulates the weather indicator display of an aircraft; i.e., the backscattering of a cloud formation only without the terrain return. The antenna shape for weather radar is usually a pencil beam, whereas a ground map radar has a cosecant square shape beam. A typical weather radar would have different colors indicative of precipitation thickness. See for example U.S. Pat. No. 4,667,199 to Roberts. A digital radar landmass simulator, with weather simulation, on the other hand has both components; the backscattering of weather and its attenuation of terrain/target.

A sophisticated weather simulation in a digital radar landmass simulator (DRLMS) or in weather radar for simulating a three-dimensional weather mass with multiple radar beam paths cannot be faulted in performance, but the cost is formidably high and difficult to achieve in real time and is sometimes considered out of proportion to both the training it offers and to the overall cost of an aircraft simulator. Several ways of modeling weather have appeared in the industry.

The three-dimensional weather masses simulated in DRLMS in the market today are modeled as simple polygons or geometric objects (e.g., cylinders). Though the processing was done in real time, the weather appeared to be artificial. Others, including both DRLMS and weather radar, modeled the weather the same as terrain with reflectivity and heights. Therefore, the weather does not have a bottom and no adjustments for heights. The simulated weather mass reaches from the top of the cloud mass to the top of the terrain. There is no gap between the terrain top and the cloud. A weather radar simulator disclosed in U.S. Pat. No. 4,493,647 to Cowdrey showed the simulation of the radar return of a weather mass composed of maps of weather cells with intensity, bottom and top. However, in the weather radar simulation, the interaction of weather with terrain (weather shadowing terrain) as required by DRLMS, was ignored. Furthermore, the weather precipitation, bottom and height, was not adjustable.

A high fidelity real time multi-channel digital radar landmass simulator is disclosed in my prior U.S. Pat. No. 4,890,249. This simulator has a modular architecture to simulate radar for simple shore-line applications to a full high fidelity air-borne radar simulator. However, the weather effects, i.e., weather backscattering, the attenuation of targets and ground map by weather mass, was not simulated. What is needed is to simulate ground map radar with the modifications by weather environmental effects.

SUMMARY OF THE INVENTION

It is therefore an object of the present invention to provide an improved radar simulation in digital radar landmass simulation for flight simulators.

It is another object of the invention to provide a three-dimensional weather simulation including operator adjustable parameters of height, bottom and precipitation.

According to a preferred embodiment of the invention, the weather simulation is a modular addition to the DRLMS as described in my prior U.S. Pat. No. 4,890,249. That DRLMS is a four channel system, i.e., culture, elevation, aspect and weather, and the weather channel is optional. All four channels are integrated to provide a simulated radar landmass simulation with weather. Implementation of the present invention in my earlier DRLMS system results in the weather simulation hardware being greatly reduced and the fidelity increased. This invention entails the full or partial occultation of terrain and targets by weather and vice versa. Contrary to conventional weather simulation in DRLMS, the weather mass is simulated in three dimensions; that is, it has a bottom and height. The weather mass is not made of simple geometric objects. Weather maps can be loaded into the system as weather patterns, and the weather patterns can be expanded, rotated and translated. In addition, the weather channel can be used to simulate chaff and jamming patterns.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
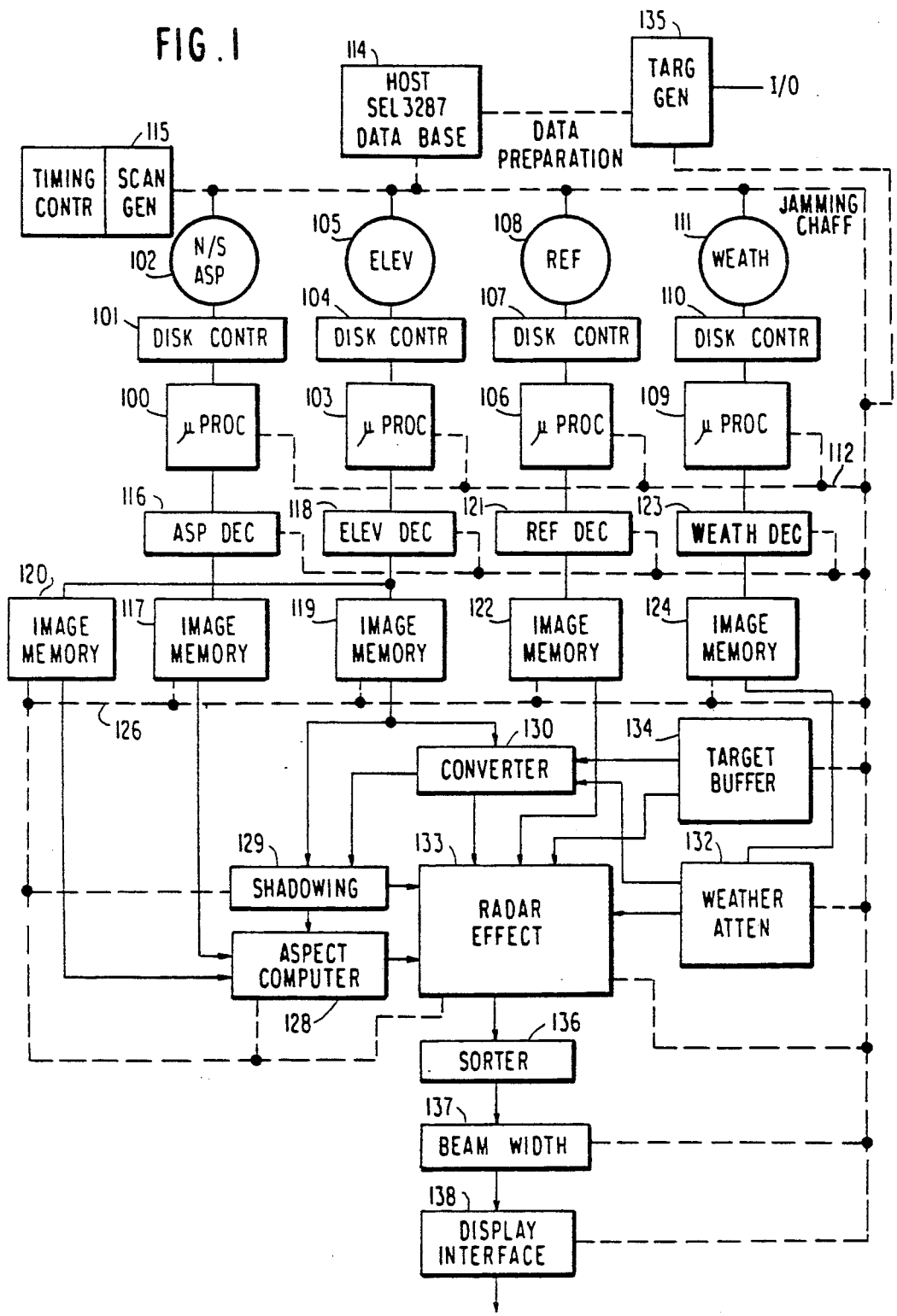
FIG. 1 is a block diagram of a modular DRLMS with a weather channel.

Referring now to the drawings, and more particularly to FIG. 1, there is shown the modular DRLMS system as disclosed in my prior U.S. Pat. No. 4,890,249. The system is characterized by a modular design and is composed of four channels; namely, a north/south aspect channel, an elevation channel, a reflectivity or culture channel, and a weather channel. Each channel includes a microprocessor which serves as a controller for the channel. More specifically, the north/south aspect channel includes microprocessor 100 connected via a disk controller 101 to a direct access storage device (DASD) 102 which is typically a hard or so-called Winchester disk drive. The elevation channel includes microprocessor 103 connected via a disk controller 104 to a DASD 105. The reflectivity channel includes microprocessor 106 connected via a disk controller 107 to a DASD 108. The weather channel includes microprocessor 109 connected via a disk controller 110 to a DASD 111. The microprocessors 100, 103, 106, and 109 may be, for example, Intel 8086 microprocessors. These are, in turn, supported by read only memory (ROM) containing Basic Input/Output System (BIOS), Operating System (OS) and program code, as well as local random access memory (RAM) and other supporting buffer registers and input/output (I/O) integrated circuits (IC), which form no part of the present invention. Further, the microprocessors 100, 103, 106, and 109 are connected to a common bus 112, and one of the microprocessors, the reflectivity microprocessor 106, acts as the master controller.

Data for each channel is compressed and stored on a host computer system 114. The host 114 may be, for example, a Gould 3287 general purpose computer with tape drives. This computer was selected for its speed, although other general purpose computers could be used. The data is compressed off line using different compression algorithms by the host 114 for each channel and stored on a corresponding one of the DASDs 102, 105, 108, and 111. Further, each channel shares common timing control and scan generator circuitry 115 to maintain synchronism of the four channels. The host 114 may be directly connected via a communications link to the DASDs 102, 105, 108, and 111, as indicated by the dotted line, or the compressed data generated by the host 114 may be supplied to the DASDs 102, 105, 108, and 111 via a floppy diskette or some other suitable medium.

The reflectivity channel data is compressed using run length coding; that is, a run of binary zeros coded as a binary number which is stored. Run length coding is commonly used for image encoding and a general explanation of this type of coding may be had with reference to the book by Richard H. Hamming entitled *Coding and Information Theory*, published by Prentice-Hall (1980). The elevation channel data is compressed using a differential coding technique; that is, "keys" representing the differences in elevation in preceding elevations are coded and stored. These "keys" are correlated with coordinates in the gaming area. Decompression is therefore a matter of reading out the stored "keys" and accumulating the differences starting from a reference elevation at a beginning scan position. The aspect channel data is compressed using a combination of run length and differential coding techniques. Decompression in this channel is a hybrid of the techniques employed in the reflectivity and elevation channels.

In the data retrieval process, data in DASDs 102, 105, 108, and 111 are read out under the control of respective microprocessors 100, 103, 106, and 109. Since the data read from the DASDs is compressed, it must first be decompressed before it can be used in the simulation process. For this purpose, each channel is provided with a dedicated decompressor and image memory to first decompress and then to temporarily store the reconstructed data. Thus, the north/south aspect channel includes a decompressor 116 and a north/south aspect image memory 117. The elevation channel includes a decompressor 118 and an elevation memory 119. In addition, east/west aspect data is reconstructed from elevation data and stored in east/west aspect image memory 120 from the decompressor 118. The reflectivity channel includes a decompressor 121 and a reflectivity image memory 122. And the weather channel includes a decompressor 123 and a weather image memory 124. The image memories 117, 119, 120, 122, and 124 are sometimes referred to as "ping-pong" memories for the reason that each may be considered as two separate memories which allow data to be written into one while data is read out of the other with the roles reversed for the next read/write memory cycle. This technique of memory management is conventional in real time systems.

The completion of the process of loading decompressed data into a respective one of the image memories is indicated to the corresponding microprocessor by the setting of a flag by the decompressor for that channel. The reflectivity microprocessor 106 not only checks the flag of completion for its own channel decompression process, it also checks the other channels though the common bus 112 to see that all the decompression processes have been completed. When all the decompression processes have been completed, the reflectivity microprocessor 106 sends a signal on memory bus 126 to all the image memories to flip their "ping-pong" memories. A similar signal is sent on common bus 112 to the other microprocessors 100, 103 and 109 to indicate the beginning of the next cycle of the data retrieval and reconstruction process. Readout of the data in image memories 117, 119, 120, 122, and 124 is controlled by the timing control and scan generator 115 over the common address bus 126.

An aspect computer 128 receives north/south aspect data from image memory 117 and east/west aspect data from image memory 120 and processes this data to produce the surface normals. It then calculates the vector dot products between the radar incident vectors and the surface normals to generate the aspect radar returns.

The data from the elevation image memory 119 is output to the shadowing hardware 129 which calculates shadowing due to terrain. Converter hardware 130 also receives data from image memory 119 and calculates the slant range from the ground range and terrain elevation. A weather attenuation hardware 132 calculates the attenuation due to the weather from the slant range and weather parameters; i.e., top, bottom, precipitation, etc.

Radar equation hardware 133 collects reflectivity information from image memory 122, along with the calculated aspect from aspect computer 128, shadowing from shadowing hardware 129, and weather attenuation from weather hardware 132, and calculates the total radar return for a given radar set parameters, i.e., sensitivity time control (STC), antenna shape, pulse length error and the like, and to include the backscattering and the attenuation effects due to weather. A target buffer 134 receives the aspect and reflectivity information of targets from a target generator 135. The target generator is a microprocessor based system using, for example, the Motorola 68020 microprocessor. This data is inserted to the terrain data at the appropriate range positions by sorter 136. The radar returns at the range bins are then integrated across the azimuth beam-width by a beam-width integrator 137 before outputting to a cathode ray tube (CRT) display through a display interface 138. If the display is a raster display, then a scan converter (not shown) would be required in place of the display interface 138.

In this system, the ownship position, range scale information, and so forth are input to the reflectivity microprocessor 106 from target generator 135. Microprocessor 106 then distributes the information to the other microprocessors 100, 103 and 109 via the common bus 112. For each channel, the microprocessor retrieves the relevant tiles of compressed data and provides the data to a buffer in the corresponding microprocessor. The dedicated decompressor hardware for each channel processes the compressed data of a tile and regenerates the gridded data for that tile.

The reflectivity data is run length compressed with four bits of reflectivity. If the run lengths are greater than 256, more words are needed for repetition. The compressed data tiles of 1024×1024 pixels are stored in blocks of data in the DASDs for each channel. Each microprocessor retrieves the compressed data from its DASD and transfers it to the decompressor registers which decode the compressed data words. For the reflectivity or culture channel, this is done in terms of reflectivity values and run lengths. Reflectivity decompressor 121 then reconstructs the reflectivity value per pixel by repeating the same reflectivity for the number of pixels equal to the associated run length.

This invention is specifically directed to the weather channel in the modular DRLMS shown in FIG. 1. The data flow is as follows. The data base generator 114 takes digitized weather patterns and compresses them before loading into the weather channel disk 111 which contains all the weather patterns in the gaming area. As in the reflectivity, elevation and aspect channels described above, the weather maps are loaded on the disk 111 corresponding to their geographic locations. The weather patterns from the disk are retrieved by the microprocessor 109 through the disk controller 110. The compressed data are loaded into the memory of the microprocessor, the tiles of data are decompressed by decompressor 123, identical to the reflectivity decompressor 121, and loaded into the image memory 124. If there are translational movements of the weather patterns, the microprocessor 109 would be given a weather velocity vector and would calculate in real time frame rate (2 sec.) the geographical locations for the weather patterns to create the appearance of weather pattern movement.

The process of decompression and loading into the image memory 124, from microprocessor 109 and decompressor 123, is similar to the reflectivity channel as described above. However, there are some additions and modifications of the DRLMS system for weather processing. The weather patterns need to have the ability to rotate and expand in addition to translational movement. This is done by programming the scan generator 115. For weather pattern rotation, the scan generator 115 is modified for the weather channel in that it is given a delta angular displacement to the scan angle. And accordingly, the x and y coordinates along a spoke for the modified scan angle are calculated by the scan generator for the weather image memory. This process in effect rotates the weather patterns stored on the disk. For weather expansion or contraction, the x and y coordinates calculated by the scan generator are multiplied by a scaling factor.

Figure 2:
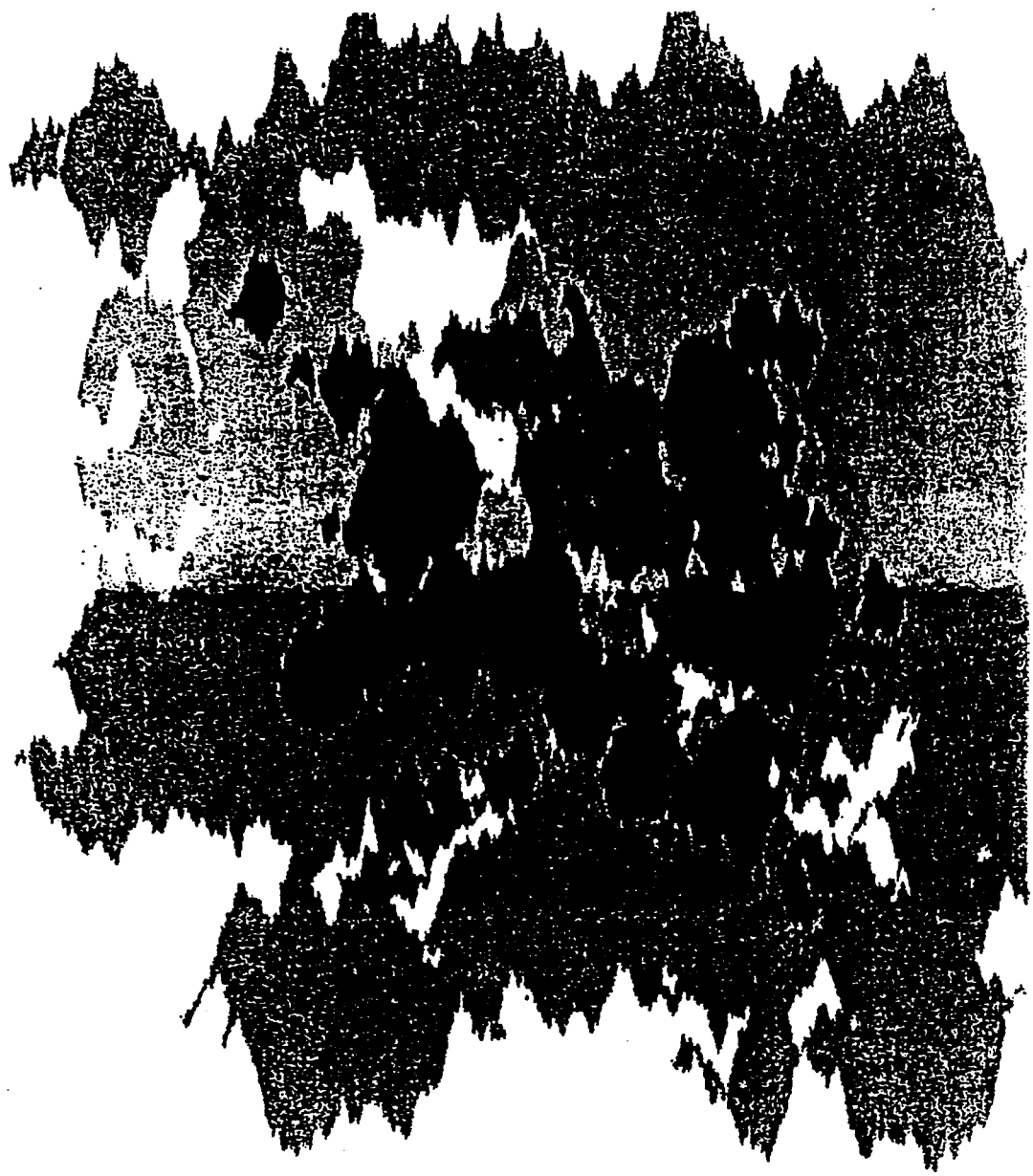
FIG. 2 is an illustration of a typical weather map.

The basic uncompressed cloud template is illustrated in FIG. 2 which shows a simple synthetically generated weather pattern, although a true radar weather map can also be used. The illustrated sample has four levels of intensity, while the maximum number in the preferred embodiment is sixteen. On the database computer 114, it takes the form of a NxM matrix, with each element consisting of a 4-bit intensity value. Any "null" data within the matrix is represented using an intensity "0", with all valid cloud template information having intensities of "1" to "15". The next off-line processing step run-length encodes the template matrix to compress the information. The resultant file consists of two distinct data structures; line pointers and run length data. The compressed data are stored on the disk 111, retrieved and decompressed and loaded into the weather image memory 124, which has the reconstructed weather patterns for the region.

Figure 3:
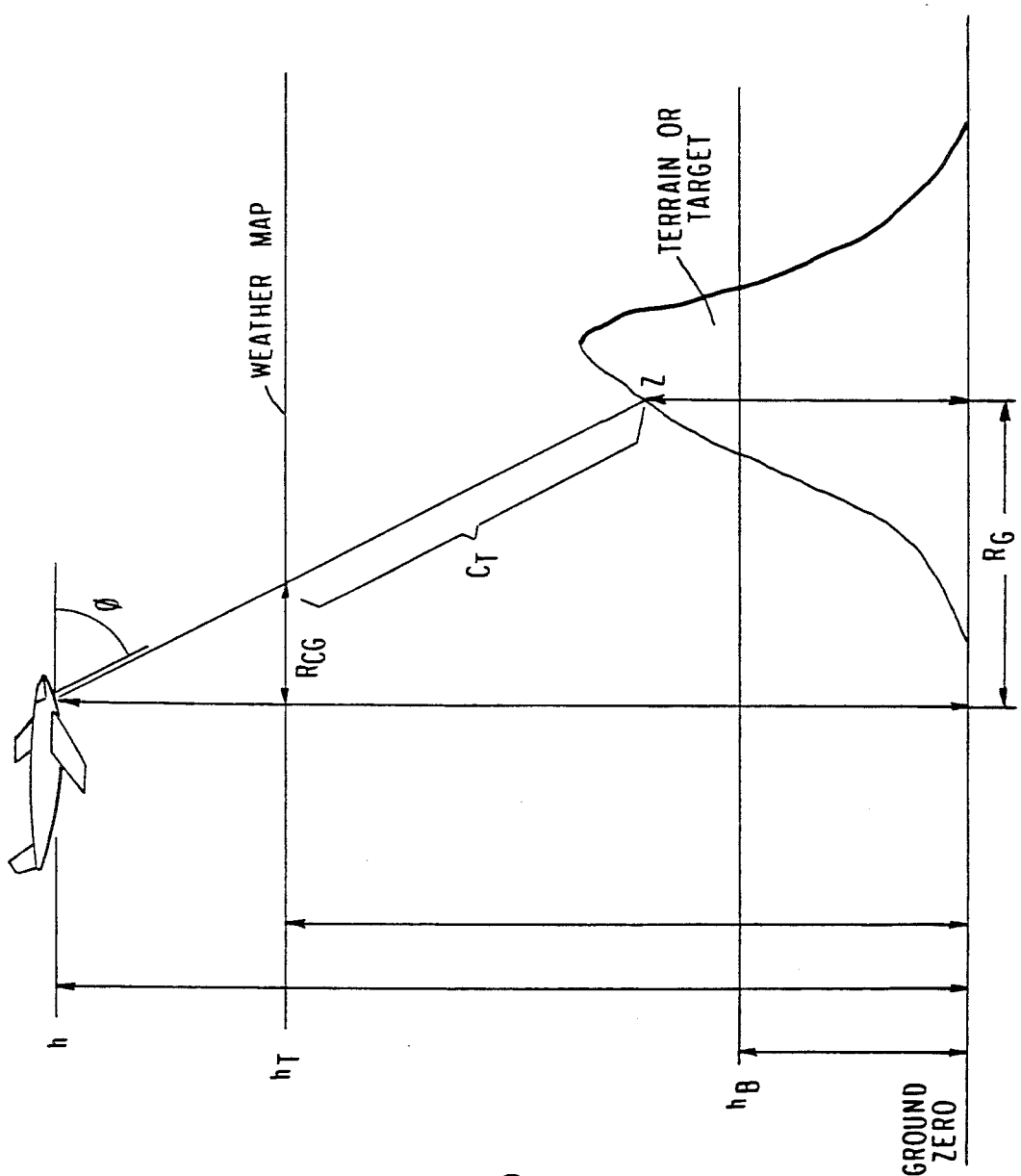
FIG. 3 is a geometrical illustration of the weather layer.

Referring now to FIG. 3, there is shown the weather model geometry and the simulation parameters. These include the weather top ($h_T$), the weather bottom ($h_B$) and depression angle ($\phi$). In this illustration, ownship position can be anywhere in, above or below the layer, and so too can be the terrain or targets. The attenuation distance ($C_T$) is calculated by a special weather attenuation circuit board 132 (FIG. 1). The radar effect board 133 (FIG. 1) calculates weather attenuation according to the weather map, attenuation distance and the precipitation rate. It is modified to process the two components required for weather processing; i.e., the backscattering (radar return of the weather mass itself) and the attenuation of the terrain by weather. The backscattering of weather and the attenuation of terrain are done at different times during the real time sweep. In FIG. 1, the scan generator 115 processes the weather attenuated terrain returns at the sweep of the spoke. It is modified such that, at the spoke retrace time, only the weather backscattering is processed. Consequently, the radar returns of selected attenuated terrain/targets and the weather backscattering are loaded to the sorter 136, which sums the radar returns of a given range bin for both sweep and retrace times, before outputting to the display interface 138 for display. The following is a more detailed description of the individual components.

WEATHER DATABASE

The precipitation factor is a function of density of the rain, rain or snow state, temperature and the frequency of the radar. It is generally expressed in the following manner.

$$A_c = ar^\beta, \quad (1)$$

where $A_C$ is the attenuation in decibels per kilometer, r is the precipitation rate in millimeters per hour, and $\alpha$ and $\beta$ are functions of frequency of a given radar. These parameters may also be dependent upon temperature and polarization, but these minor dependencies can usually be ignored for practical purposes. So for a given precipitation rate, the attenuation factor can therefore be calculated. For X-band radar, the reflectivity factor, F, or backscattering of the rain is given by the well known Marshall-Palmer relationship, as follows:

$$F = 200r^{1.6}. \quad (2)$$

From the above equations, the reflectivity, F, of a cloud is directly proportional to its ability to attenuate the terrain. The attenuation $A_C$, for X band radar for instance, the following equation from L.J. Batton, *Radar Meteorology*, University of Chicago Press (1959) holds:

$$A_C = 2.9 \cdot 10^{-4} F^{0.72}. \quad (3)$$

Therefore, given the weather reflectivity map in F, the attenuation factor A can be derived. Similarly, the attenuation of snow can also be derived from its reflectivity by a different equation.

In the database preparation, a cloud reflectivity pattern or "template" library of several basic cloud types were designed prior to the operations. This template can be derived synthetically or from a weather map. The major attributes defined by each template are at least cloud boundary and intensity and may optionally include size. Thus, on-line expansion by hardware is provided. During the on-line processing, the operator can give the cloud expansion, rotation and position. The cloud templates are essentially reflectivity maps which can be overlaid on each other off-line to create a composite for a geographic area. A template is designed such that outside the outer boundary, the reflectivity is zero. The weather maps are compressed as in the reflectivity compression.

WEATHER CHANNEL HARDWARE

Figure 4:
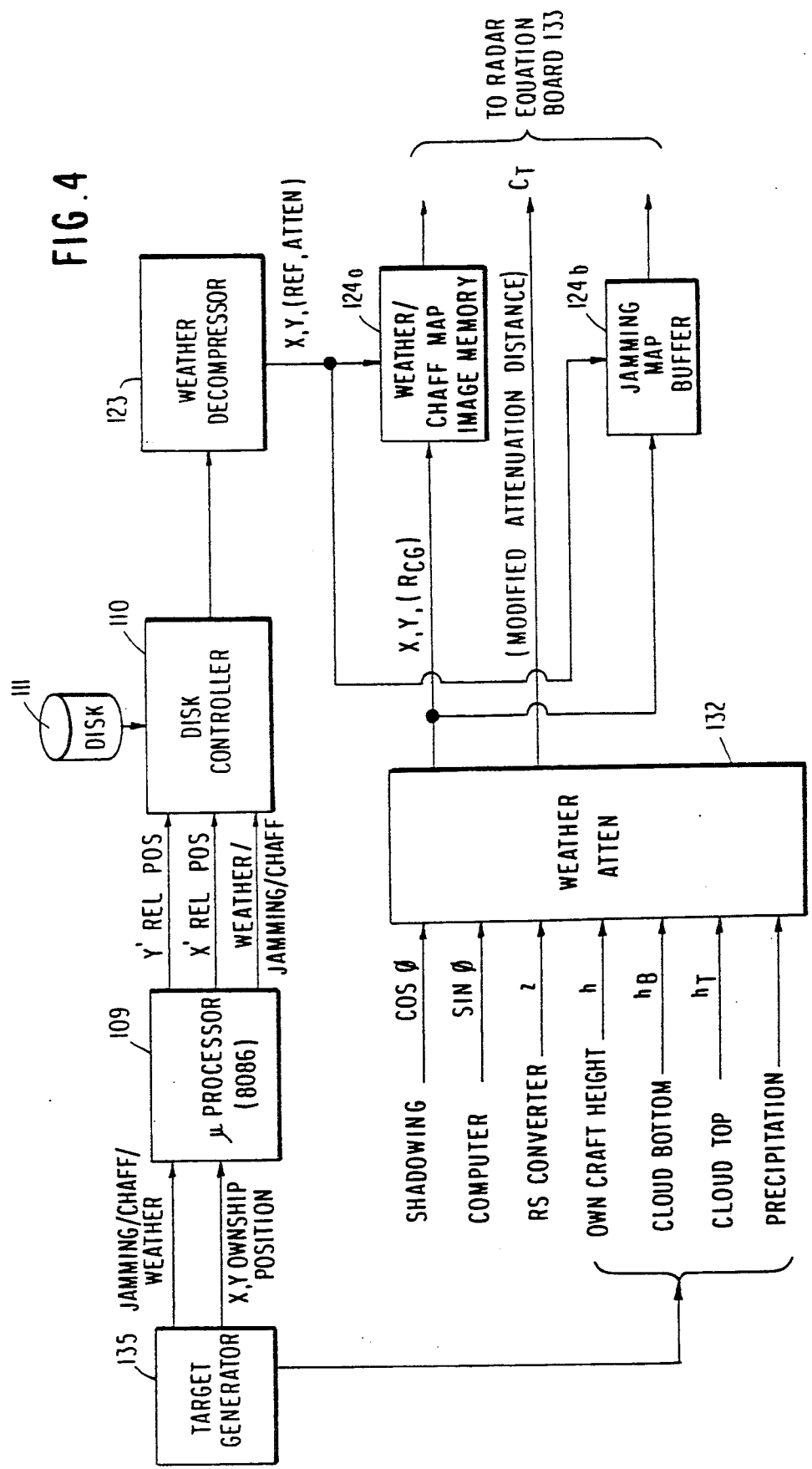
FIG. 4 is a block diagram of the weather channel hardware.

The weather channel hardware constitutes the fourth channel to the DRLMS system disclosed in my prior U.S. Pat. No. 4,890,249, with one board unique to this channel, and some system modifications. The advantage of the template/map approach to weather simulation is its capability to simulate weather maps of any irregular shape. However, weather maps can only give a two-dimensional weather return. As shown in FIG. 4, a weather attenuation circuit board 132 is added together with the modification of the radar effect circuit board 133 to present the returns of three-dimensional weather. The three-dimensional weather has top, bottom and attenuation. It also allows for ownship, terrain and target penetration of the weather layer where correct partial attenuations are calculated. The range to weather is generated by a modified "ground" range, $R_{cg}$, instead of $R_g$ shown in FIG. 3, to allow for the expansion of weather as the ownship approaches the weather mass.

The weather channel hardware, which may also be used to simulate chaff and jamming, is shown in FIG. 4. Chaff is three-dimensional like weather but of different reflective patterns. In the design, the weather mass and chaff do not overlap each other. The weather and chaff maps are located physically on the disk in the compressed form at certain geographical locations. They can be enabled or disabled by the control inputs to the weather microproccessor 109. When weather/chaff is enabled, the weather microprocessor 109 retrieves the compressed weather data tile of the range scale selected from the disk 111. The disk 111 then outputs this data to the weather/chaff decompressor 123 which reconstructs the maps of 1024×1024 pixel tile size and stores the data in memory 124a. Jamming simulation uses the same weather data retrieval and decompression hardware but outputs the jamming patterns using the time remaining after the decompression of the weather patterns before the start of the next two second image memory update. The jamming image memory 124b stores the image pattern and it is enabled when jamming is called for. The jamming information is outputted to the sorter buffer 136 (shown in FIG. 1), overlaying all the radar information that is there before presenting the jamming pattern on the scope.

The weather attenuation module 132 (see FIG. 5) generates the modified attenuation distance $C_T$ to the radar equation circuit board 133. A detailed block diagram for this board 133 is shown in FIG. 6, described in detail hereinafter. The weather attenuation module 132 receives inputs of cloud top/bottom ($h_T$, $h_B$), precipitation rate (as set by the instructor and inputted from the target generator 135), sine/cosine of the depression angle $\phi$ (from the shadowing computer 129), elevation z (from the slant range converter 130), and the ownship position h and calculates the cloud distance. There are different cases to be considered. The different cases are the following:

Ownship position and target/terrain are both outside of the cloud, either both are below or above the cloud. In this case, there is no cloud between the pilot and the terrain/target, hence no attenuation.

$$\left. \begin{array}{l} \text{If } h, z > h_T, \\ \text{or } h, z < h_B \end{array} \right\} \text{ then } C_T = 0 \quad (4)$$

The second case is that both ownship and target/terrain are within the cloud. In this case, the attenuation distance is between ownship and target/terrain.

$$\left. \begin{array}{l} \text{If } h_T > h > h_B \\ \text{and } h_T > z > h_B \end{array} \right\} \text{ then } C_T = \frac{h-z}{\sin\phi} \quad (5)$$

The third case is either ownship is in the cloud and terrain/target is outside the cloud or vise versa. For ownship above the cloud and the terrain/target in the cloud, $$\left. \begin{array}{l} h > h_T \text{ and} \\ h_T > z > h_B \end{array} \right\} \text{ then } C_T = \frac{h_T - z}{\sin\phi} \quad (6)$$

Assuming a ground mapping radar, the radar is looking down so that the case $h_B > h$ and $h_T > z > h_B$ is not considered. For ownship within the cloud and the target/terrain below the cloud, $$\left. \begin{array}{l} h_B > z \text{ and} \\ h_T > h > h_B \end{array} \right\} \text{ then } C_T = \frac{h - h_B}{\sin\phi} \quad (7)$$

Figure 5:
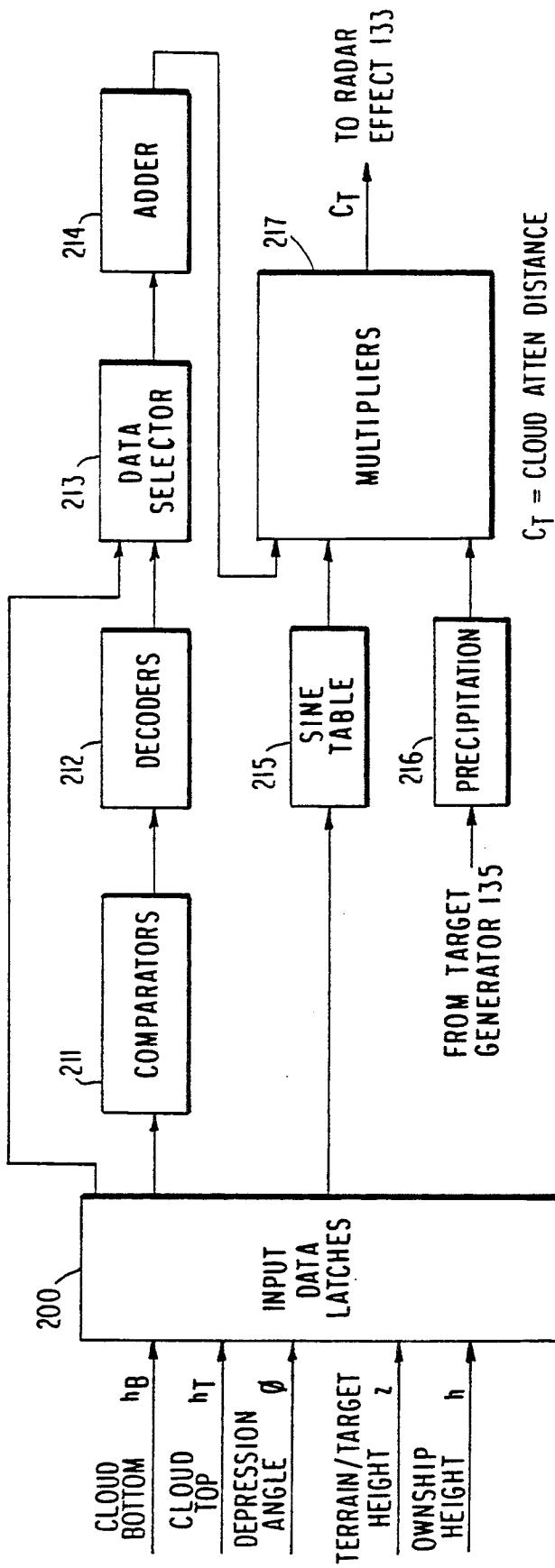
FIG. 5 is a block diagram of the weather attenuation board.
Figure 6:
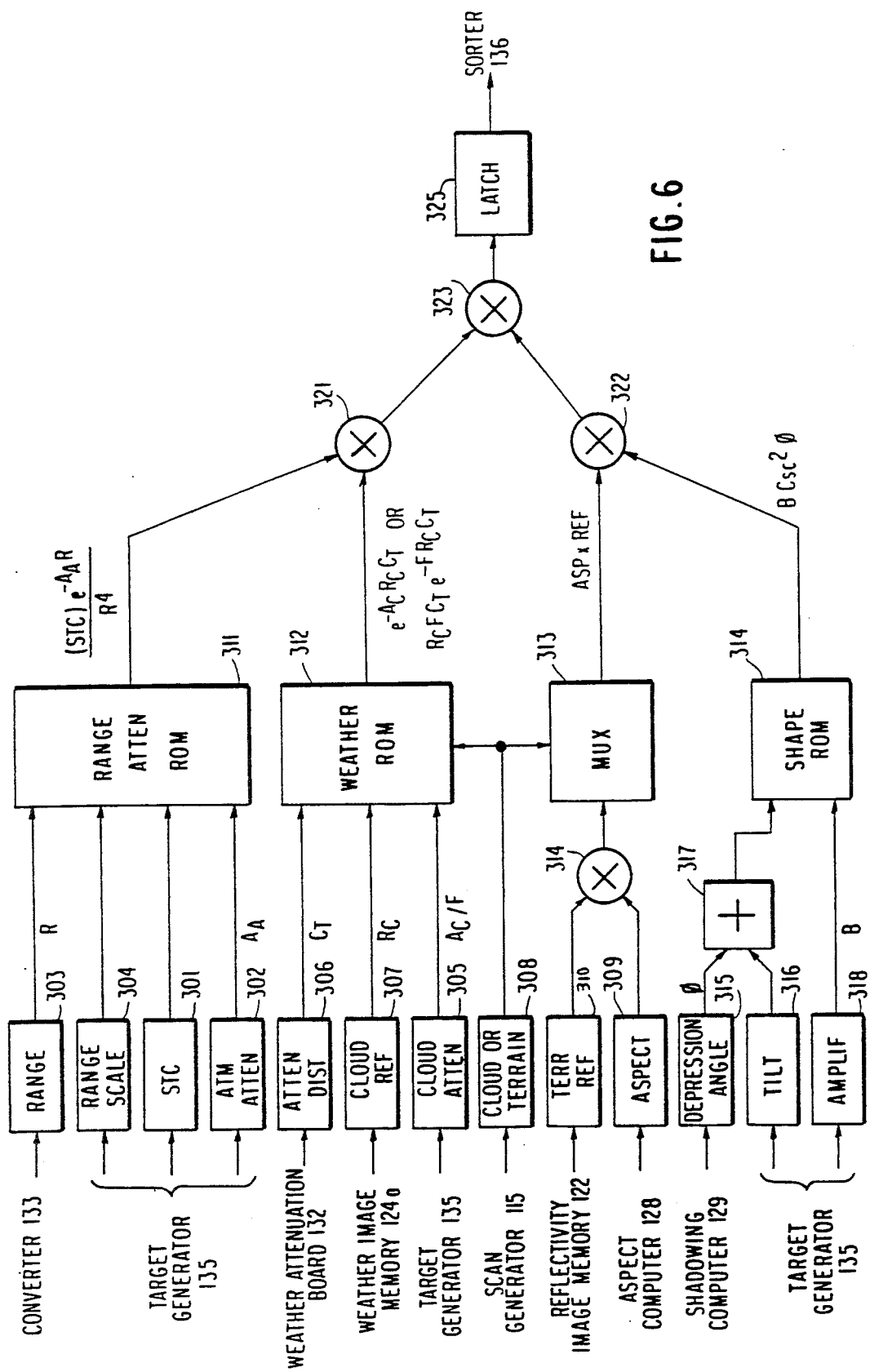
FIG. 6 is a block diagram of the radar equation board with weather processing.

In FIG. 5, the parameters h, $h_T$, $h_B$, and z are compared with each other by comparators 211 and decoded by decoders 212, which in turn enable the selector 213 to select the data in latches 200 required for calculating $C_T$ for the cases described above. The adder 214 provides the subtraction required for the numerators while the table lookup 215 of the depression angle $\phi$ provides the denominator for all equations. The multipliers 217 perform the calculation of $C_T$, which is output to the radar equation board 133 shown in FIG. 6. Precipitation, as input by the instructor, is supplied as a multiplication constant by attenuator 216. For backscattering, the modified ground range $R_{cg}$ is used. As shown in FIG. 3, the depression angle $\phi$ gets smaller and $R_{cg}$ becomes larger, to the extent of the weather map. $R_{cg}$, the modified ground range as an address to the weather image memory 124a, is calculated knowing the ground range $R_g$ of the terrain, its elevation z, and the depression angle $\phi$. The equation for calculating $R_{cg}$ is $$R_{cg} = \frac{h - h_T}{\tan\phi}, \text{ limit } R_{cg} = R_o, \text{ as } \phi \to 0 \quad (8)$$

where $R_o$ is the range scale selected. This technique allows for weather mass expansion for backscattering and attenuation as ownship approaches the weather mass.

RADAR EFFECT BOARD

The weather attenuation board described above calculates the distances for cloud attenuation $C_T$ and the backscattering weather map lookup address $R_{cg}$. The radar effect board 133 collects all the radar and environmental data to generate the simulated radar effect. In weather processing, the radar effect board receives the weather map information and processes it for either backscattering or attenuation. In backscattering, the reflectivity template as modified by the attenuation is displayed on the screen; for weather attenuation of the terrain, the modulated terrain returns are displayed. Terrain attenuation is done at the sweep of the spoke generated by the scan generator 115, shown in FIG. 1, and the backscattering is done at the retrace of the sweep. These are superimposed on each other at the sorter buffer 136 to give the composite display of both backscattering and attenuation.

FIG. 6 shows a block diagram of the radar effect board. It can be divided into three sections. The top section processes range information. This section provides the range attenuation due to STC, i.e., enable at STC block 301 from target generator 135, which is a modulation factor with distance specific to a given radar, and the atmospheric attenuation due to air with attenuation factor $A_A$ input at atmospheric attenuation block 302 from target generator 135. The distance R, input at range block 303 from the converter 130, has to be scaled back by the range scale, at range scale block 304 input from target generator 135, to give the true distance, as required for the attenuation calculations. These inputs address a range attenuation table lookup ROM 311 which provides as an output the following value:

$$\frac{(STC)e^{-A_A R}}{R^4},$$

where the table STC amplitude as a function of range is created off-line for a given radar set.

The middle section of the radar effect board processes the radar effect calculation from cloud effects. The target generator 135 calculates the attenuation $A_C$ due to precipitation from equation (1). Likewise for backscattering, the cloud reflectivity F is calculated from equation (2). These values are input at cloud attenuation block 305. The calculated value $C_T$ from the weather attenuation board 132 is input at attenuation block 306. $R_C$, the reflectivity maximum of weather from the weather image memory 124a, as read from the address $R_{cg}$, is input at cloud reference block 307. For attenuation, these values are used to address weather table lookup ROM 312 to provide as an output the following value:

$$e^{-A_C R_C C_T}$$

where $A_C$ is from equation (1). In back scattering simulation, the weather reflectivity, $R_C$, is modified by the reflectivity from precipitation, F, from equation (2), calculated by the target generator 135. The output of the weather table lookup ROM 312 for backscattering is the following value:

$$R_C F C_T e^{-F R_C C_T}$$

The model will simulate a heavy weather front as $C_T$ or F become large. The scan generator 115 provides an output to selector 308 to select the correct output of weather table lookup ROM 312 as either attenuation of terrain by the sweep gate timing signal or back scattering during the retrace time, when the weather map stored in image memory 124 will be read out.

The bottom section of the radar effect board processes the vertical antenna shape return for the given radar with antenna tilt and amplitude B provided by the target generator. Aspect computer 102 (FIG. 1) provides an input at aspect block 309, and the reflectivity image from memory 122 is input at terrain reflectivity block 310. These values are multiplied to provide a product output in multiplier 314. In weather backscattering or chaff, the aspect times terrain reflectivity output is forced to a "1" output by multiplexer 313, so that only the weather reflectivity through multiplier 321 will be displayed without aspect. The shadowing computer 129 (FIG. 1) provides the value of the depression angle $\phi$ at depression angle block 315, and the target generator provides the antenna tilt at block 316. These are added in summer 317 to provide a summed output. The amplitude, B, is supplied by the target generator at amplitude block 318. The outputs of summer 317 and amplitude block, 318 are used to address shape lookup table ROM 314 which provides as its output $B \csc^2 \phi$, which represents the antenna gain pattern for an air to ground radar.

The outputs of the range attenuation table lookup ROM 311 and the weather lookup table ROM 312 are multiplied in multiplier 321 to form a first product. The outputs of the multiplexer 313 and the shape lookup table ROM 319 are multiplied in multiplier 322 to form a second product. The first and second products from multipliers 321 and 322 are multiplied in a multiplier 323 to provide a solution to the radar equation for weather effects. The output of multiplier 323 is latched in latch 325, and the output of latch 325 is supplied to sorter 136 shown in FIG. 1.

The invention thus provides a unique modular approach to weather simulation in a digital radar land mass simulation. This solution simulates weather in three dimensions and allows the instructor a great deal of flexibility in setting various parameters of the weather in the gaming area. This is all accomplished with a minimum of computing hardware.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of real time three-dimensional weather generation in digital radar landmass simulation comprising the steps of:
    compressing off line digital weather data as a compressed weather data base for the simulation;
    storing the compressed weather data in a database for later access and reconstruction for the simulation;
    synchronously ad continuously accessing the compressed weather data from said database and reconstructing and temporarily storing the data;
    inputting weather top, weather bottom and depression angle data;
    inputting weather expansion, rotation and translation data;
    computing weather expansion, rotation and translation as ownship approaches a weather mass in a weather simulation;
    computing from said weather top, weather bottom and depression angle data and from the computed weather expansion, rotation and translation a modified attenuation distance; and
    processing the temporarily stored weather data with said modified attenuation distance to produce a real time simulation of weather.

2. The method of real time weather generation recited in claim 1 wherein said step of inputting weather top and weather bottom data is performed using weather reflectivity maps.

3. The method of real time weather generation recited in claim 2 wherein said weather reflectivity maps are used to compute both a modified attenuation distance and, in addition, backscattering due to weather.

4. The method of real time weather generation recited in claim 1 further comprising the steps of:
    inputting position and reflectivity data for chaff; and
    computing radar jamming.

5. A modularized digital radar land mass simulator comprising:
    means for compressing off line digital aspect, elevation, reflectivity and weather data as compressed data for the simulation;
    means for storing the compressed data in a database for later access and reconstruction;
    first, second and third channels for accessing said compressed data in said database and reconstructing and storing respectively aspect, elevation and reflectivity data and synchronously and continuously retrieving said data in real time;
    means for generating scan and depression angles and computing radar incident vectors;
    aspect computer means connected to said first channel for generating radar aspect returns;
    shadowing and converter means connected to said second channel for calculating shadowing due to elevation and slant range as a function of ground range;
    radar equation means connected to said third channel and said aspect computer means and said shadowing and converter means for calculating a simulated radar image;
    display means connected to said radar equation means for displaying a simulated radar image;
    a fourth channel for accessing said compressed data in said database and reconstructing and storing weather data and synchronously and continuously retrieving said weather data in real time, said fourth channel including:

data input means for temporarily storing cloud top data, cloud bottom data, weather expansion, rotation and translation data, depression angle of a simulated radar antenna pattern, terrain height and ownship height;

detecting means responsive to data temporarily stored in said data input means for detecting the respective relative positions of ownship and terrain with respect to clouds; and computing means responsive to said detecting means for selecting data from said data input means for computing a modified attenuation distance between ownship and terrain due to weather effects, said computing means computing weather expansion, rotation and translation as ownship approaches a weather mass in a weather simulation;

said radar equation means being responsive to said modified attenuation distance for modifying said simulated radar image to account for weather effects in real time.

6. The modularized digital radar land mass simulator as recited in claim 5 further including weather map means for storing weather maps from which are input said cloud top and cloud bottom data.

7. The modularized digital radar land mass simulator as recited in claim 6 wherein said weather maps are used by said means for computing to compute both said modified attenuation distance and backscattering due to weather.

8. The modularized digital radar land mass simulator as recited in claim 5 wherein said data input means also temporarily stores chaff distance and reflectivity data, said means for computing additionally computing radar jamming.

9. A real-time three-dimensional, high-resolution weather channel for a modular digital radar land mass simulator comprising:

means for compressing off line digital weather data as a compressed weather database for the simulation;

storage and data retrieval means for accessing said database and reconstructing and storing weather data and synchronously and continuously retrieving said weather data in a real time;

data input means connected to said storage and data retrieval means for temporarily storing cloud top data, cloud bottom data, weather expansion, rotation and translation data, depression angle of a simulated radar antenna pattern, terrain height and ownship height;

detecting means responsive to data temporarily stored in said data input means for detecting the respective relative positions of ownship and terrain with respect to clouds; and computing means responsive to said detecting means for selecting data from said data input means for computing in real time weather expansion, rotation and translation as ownship approaches a weather mass in a weather simulation, said computing means computing from said weather top, weather bottom and depression angle data and from the computed weather expansion, rotation and translation a modified attenuation distance between ownship and terrain due to weather effects.

10. The weather channel recited in claim 9 further including weather map means for storing weather maps from which are input said cloud top and cloud bottom data.

11. The weather channel recited in claim 10 wherein said weather maps are used by said means for computing to compute both said modified attenuation distance and backscattering due to weather.

12. The weather channel recited in claim 9 wherein said data input means also temporarily stores chaff distance and reflectivity data, said means for computing additionally computing radar jamming.

* * * * *